Dec. 12, 1933.    H. MOSCHEL    1,938,971
RAKE
Filed Nov. 29, 1929    2 Sheets-Sheet 2
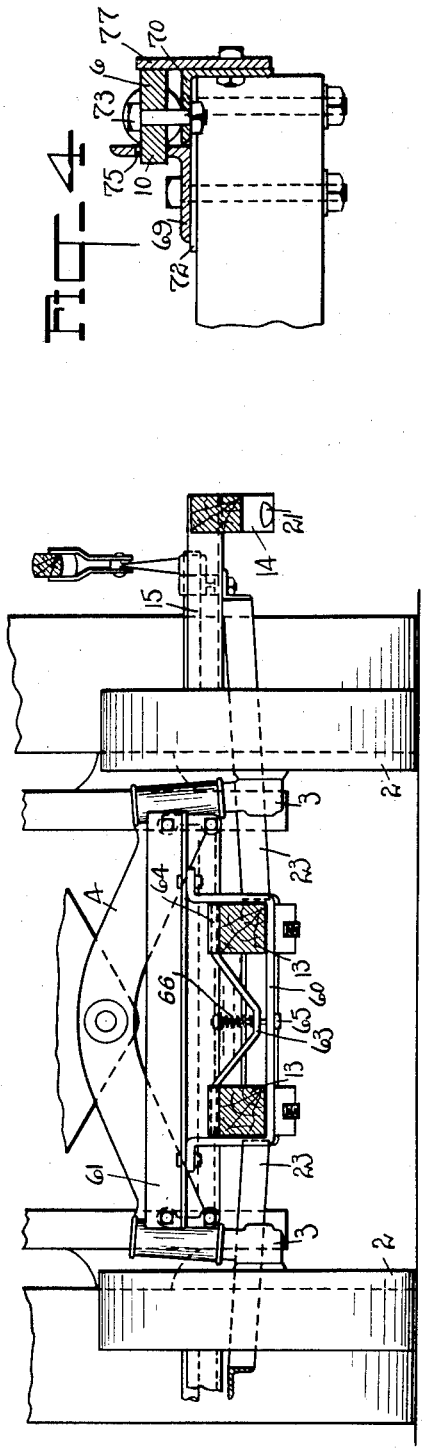
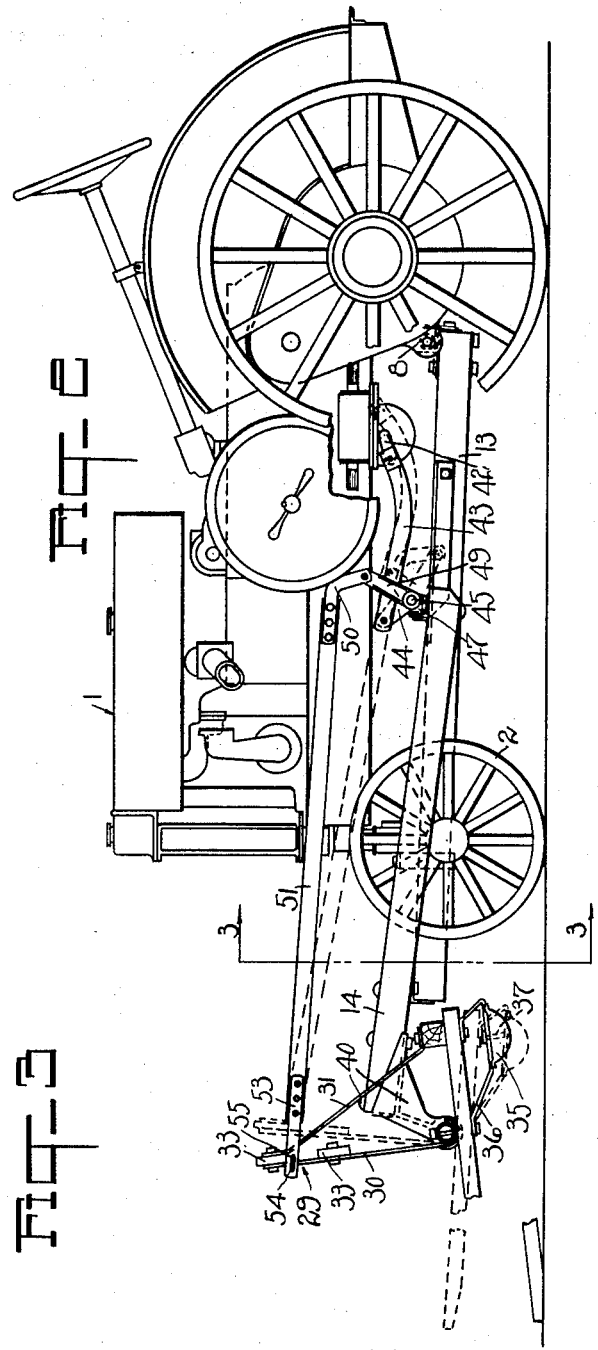
INVENTOR
Herman Moschel.
BY Brown, Jackson, Boettcher & Dienner.
ATTYS.
WITNESS
A. D. McLeay Patented Dec. 12, 1933

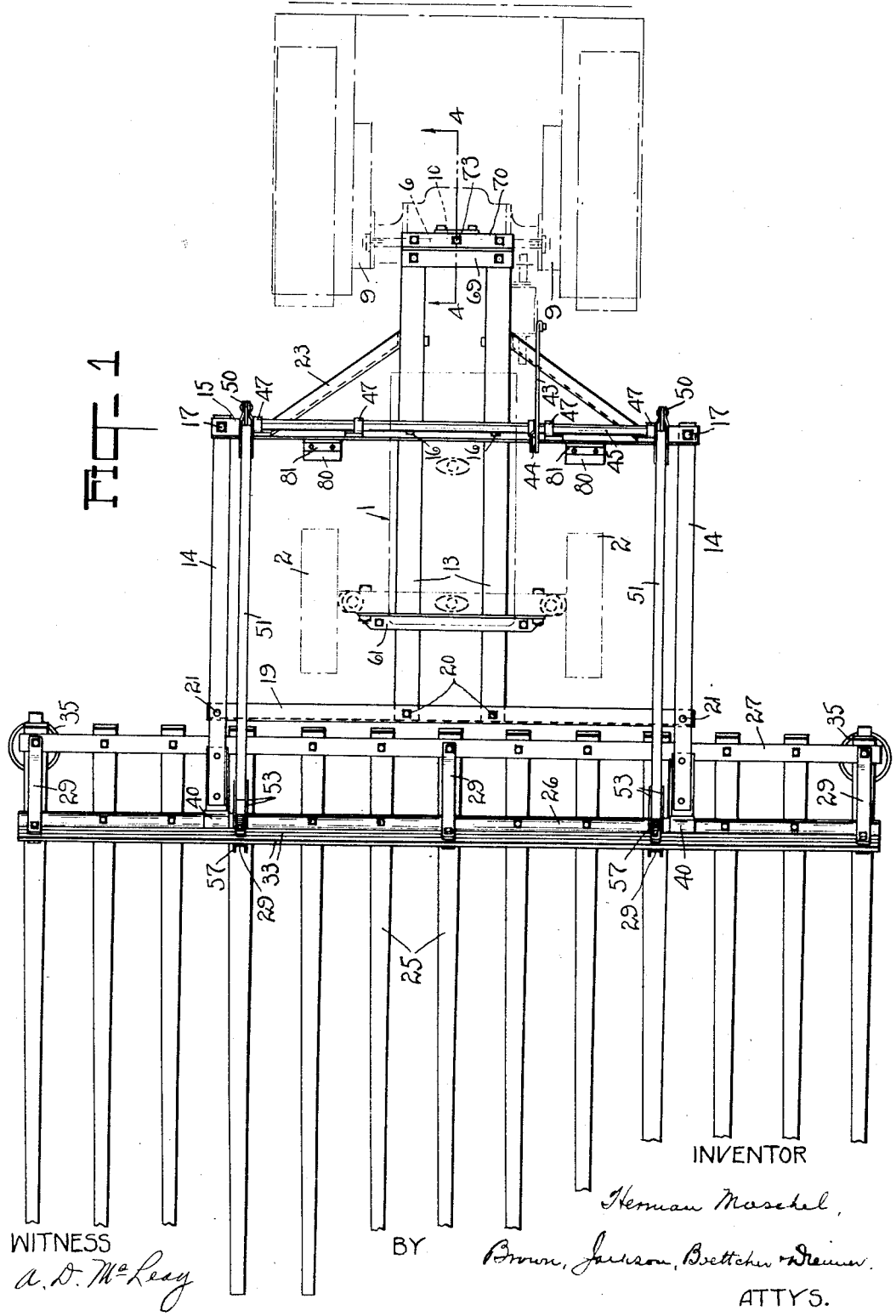

1,938,971

UNITED STATES PATENT OFFICE 1,938,971

RAKE

Herman Moschel, Ottumwa, Iowa, assignor to Dain Manufacturing Company of Iowa, Ottumwa, Iowa, a corporation of Iowa Application November 29, 1929
Serial No. 410,379

44 Claims. (Cl. 56—27)

This invention relates to one type of sweep rakes in which the head that carries the raking teeth is pivotally mounted on a frame that is supported by a tractor, the power of which is utilized not only to push the rake forwardly in hay gathering position but also to rock the pivoted head so that the raking teeth may be raised from the ground to facilitate transporting the hay.

The principal object of my invention is to provide certain improvements, in rakes of the type above referred to, which improvements have to do particularly with the manner and the means by which the rake is mounted on the tractor.

More specifically the objects of my invention include the provision of means for attaching the rake to the tractor so as to relieve the tractor of certain strains, as when the rake is operated over rough ground. Another object is to provide detachable means for connecting and supporting the rake from the tractor in a flexible manner.

Other objects and advantages of my invention will be apparent to those skilled in the art after a consideration of the following detailed description, taken in conjunction with the accompanying drawings wherein like numerals refer to like parts and in which:

Figure 1 is a plan view of the rake, with the relative position of the tractor shown in dotted lines;

Figure 2 is a side elevation of the rake shown mounted on the tractor, the full lines showing the rake in raking position and the dotted lines showing the rake in elevated or transport position;

Figure 3 is a cross-sectional view taken along the line 3—3 of Figure 2; and

Figure 4 is an enlarged cross-sectional view taken along the line 4—4 of Figure 1.

Referring to the drawings, the reference numeral 1 indicates the tractor generally, and the tractor is provided with the usual front steering wheels 2 carried by steering arms 3 pivotally mounted at the ends of a front axle 4. At the rear of the tractor the usual drawbar 6 is provided supported from the tractor in any known manner, as by lugs 8 mounted on or formed as a part of the housings 9. The drawbar 6 of the tractor is provided with a central flattened portion 10 for a purpose to be described later.

The frame of the rake comprises two inner longitudinal beam members 13 and two outer slightly upwardly inclined beam members 14. A rear angle iron 15 extends transversely across the members 13 near the center thereof and is bolted to the top thereof by means of bolts 16. The rear angle iron 15 extends also to the longitudinal beam members 14 and to which it is secured, as by bolts 17. The longitudinal members 14 do not extend rearwardly farther than the rear angle iron 15.

An angle iron 19, similar to the rear angle iron 15, extends across the front of the inner longitudinal members 13 and is bolted thereto, as by bolts 20. The outer longitudinal beam members 14 are secured to the angle iron 19 by bolts 21. The rear angle iron or transverse member 15 is braced by diagonal braces 23 which are fastened to the under side of the angle iron 15 and to the sides of the inner longitudinal beam members 13.

The brake head comprises forwardly extending rake teeth 25 which are intended to be connected to a transverse shaft or tubular member 26 and to a rear transverse connecting beam 27. The rake head is provided with a number of vertical upstanding arms 29, each of which include a vertical support 30 and a diagonal support 31. These upstanding arms 29 serve to support two rear boards 33.

On the underside and at the ends of the rake head a runner or shoe 35 is provided. Each of these runners or shoes takes the form of a semispherical member and is bolted to a bracket 36 by means of a counter sunk bolt 37. The bracket 36 is bolted at the rear end of each of the two end rake teeth by means of the same bolts by which the teeth are fastened to the tubular member 26 and the transverse connecting beam 27.

The rake is pivotally mounted at the forward end of the outer longitudinal beam members 14 by means of brackets 40, when secured to the forward end of each of the longitudinal members 14. The shaft or tubular member 26 is journaled in the ends of the brackets 40 so that the rake is pivotally mounted for rotation about the axis of the shaft or tubular member 26.

The angular position of the rake on the frame is controlled by means of a connection to the power lift crank 42 on the tractor 1. This connection comprises a link 43 pivoted at its rear end to the power lift crank 42 and at its front end to an upwardly and forwardly extending arm 44 on the rock shaft 45, the shaft 45 being journaled in bearings 47 carried by the transverse angle iron 15.

Fixed to the shaft 45 at each end thereof is an upwardly and rearwardly extending arm 49, as shown in Figure 2.

A pair of downwardly extending brackets 50 are bolted to the rear end of each of two links or poles 51, the ends of which are pivotally connected to the ends of the arms 49, respectively. At its front end, each link or pole 51 is provided with two extension brackets 53 bolted thereto, and each of the brackets 53 has a longitudinal slot 54 formed in the end thereof. A small block is positioned between the supports 30 and 31 of the second and fourth vertical arms 29, and these blocks have pintles 55 projecting into the slots formed in the brackets 53. A spring 57 is interposed between the forward end of the link or pole 51 and the corresponding arm 29 for the purpose of yieldingly pressing the rake teeth on the ground surface.

The frame of the rake is carried by the tractor in a U-shaped bracket 60 bolted to the underside of a transverse angle iron 61 which, in turn, is bolted across the front space of the front wheel axle 4. The inner longitudinal beams 13 rest in the two corners of the bracket 60 and are yieldingly held in position by means of a V-shaped member 63, the ends of which rest on metal pads 64 provided on the top of the beams 13. A bolt 65 passes through perforations in the center of the members 60 and 63 and supports a spring 66 which embraces the bolt 65 and exerts a downward pressure on the top surface of the bracket or V-shaped member 63. The spring is held in position on the bolt by means of a nut threaded on the upper end of the bolt 65.

The rear ends of the inner longitudinal beam members 13 are connected together by means of two angle irons 69 and 70 by which they are supported from the tractor draw bar 6. A bearing plate 72 is provided on the top surface of each beam 13 upon which the angle irons 69 and 70 rest. A single bolt 73 passes through a hole in the center of the flattened portion 10 of the draw bar 6 and a perforation in the center of the angle irons 70.

The upper flange of the angle iron 69 is provided with an elongated slot 75 which is adapted to receive the front projection of the center flattened portion 10 of the draw bar 6. The rear portion of the center flattened portion 10 of the draw bar 6 is adapted to bear against the flat face of a plate 77 fixed to the downwardly extending flange of the angle irons 70 as shown in Figure 4.

The operation of the rake is believed to be obvious from its description. When in gathering or raking position the teeth 25 are in the position shown in full lines in Figure 2. When a load has been accumulated the operator sets the power lift crank 42 in operation to swing the same from the full line position of Figure 2 to the position shown in dotted lines. It will be observed that he crank 42 revolves through substantially a half revolution, which motion through the link 43 rocks the shaft 45 and hence the arms 49. The arms 49 thus retract the poles or links 51 which, by virtue of the connection at 54 and 55, swing the rake head and teeth to the position shown in dotted lines in Figure 2, whereupon the load accumulated is easily transported to any desired place.

By reason of the single bolt connection at the rear end of the rake frame a connection which is, in effect, a universal connection, is provided to support the rear end of the rake frame to the tractor.

By virtue of the spring connection at 65 the beams 13 are capable of a certain amount of vertical movement in the bracket 60. Thus the rake has an appreciable amount of flexibility with respect to the tractor so that it may twist or warp when going over rough ground, and at this time one or the other of the shoes 35 bears on the ground to aid in supporting the rake. The connection of the rake at the rear with the draw bar 6 is an important feature of my invention in that the load of the rake has no unstabilizing effect on the tractor.

In the operation of attaching the rake to the tractor, the rake is laid flat on the ground and the front wheels of the tractor are driven over the members 23, over the rock shaft 45, and the angle iron 15. These elements are all strong enough not to be injured when the front wheels of the tractor are driven over them.

When the rake is to be disconnected from the tractor, the tractor is backed, the front wheels 2 passing back over the members 23, 45 and 15, mentioned above. To aid the front wheels in climbing over the angle iron 15, plates 80 are provided and which are attached to the under side of the angle iron 15 in line with the front wheels 2. The plates 80 are reinforced by angle iron sections 81 placed against the vertical flange of the angle iron 15 and bolted to the top of the plates 80.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. A rake adapted to be mounted on a tractor including a frame and a plurality of teeth operatively carried by the frame, and means including a bracket in which the frame is engaged and yieldable means for holding the frame against the bracket for flexibly supporting the frame from the tractor.

2. A rake adapted to be mounted on a tractor, including a frame and a plurality of teeth operatively carried by the frame, means for permitting the rake to move vertically when encountering rough ground, comprising three point suspension means flexibly supporting the frame from the tractor and ground engaging means to cause said rake to follow irregularities of the ground.

3. A rake adapted to be mounted on a tractor provided with a draw bar, including a frame and a plurality of teeth carried by the frame and a three point suspension system comprising, a single means connecting the rear of the frame to the draw bar, and means supporting the forward portion of the frame on the tractor.

4. A rake adapted to be carried by a tractor and comprising a frame and a rake head thereon having teeth, and means to support said parts on the tractor, including a pivotal connection near one end of the tractor and a yielding connection near the other end of the tractor, whereby the rake is flexibly carried.

5. A rake adapted to be mounted on a tractor comprising a frame and a rake head thereon having teeth, said frame being adapted to extend under the tractor, and means to removably secure said parts to the tractor, including a U-shaped housing cooperating with a spring pressed bracket for supporting the frame at the front of the tractor and means supporting the rear of the frame from a single point near the rear of the tractor.

6. A rake adapted to be mounted on a tractor comprising a rake frame, a rake head having teeth and mounted at the forward end of said frame, said frame including cross members and a pair of longitudinal members spaced close together and adapted to extend under the tractor, means pivotally connecting the rear ends of said longitudinal members to the rear of the tractor, means connecting the forward portion of said longitudinal members with the front of the tractor, and a second pair of longitudinally extending members engaged with the cross members and extending forwardly for pivotal engagement with the rake head.

7. A rake adapted to be mounted on a tractor comprising a rake frame, a rake head having teeth and mounted at the forward end of said frame, said frame including cross members and a pair of longitudinal members spaced close together and adapted to extend under the tractor, means connecting the rear ends of said longitudinal members to the rear of the tractor, a bracket secured to the front of the tractor and adapted to support the forward portion of the longitudinal members, and means yieldingly holding said members against the supporting portion of the bracket.

8. A rake comprising the combination of a tractor, having a power lift, a rake frame, a rake head having teeth and upwardly extending arms, means pivotally mounting the rake head to the frame for movement between a raking position and a transport position, said frame including a pair of longitudinal members adapted to extend underneath the tractor and to be secured thereto, and means comprising links and a rock shaft connecting the upstanding arms to the power lift of the tractor.

9. A rake comprising the combination of a tractor having a power lift, a rake frame, a rake head having teeth and upwardly extending arms, means pivotally mounting the rake head to the frame for movement between a raking position and a transport position, said frame including cross members and a pair of longitudinal members spaced close together and adapted to extend under the tractor, means connecting the rear ends of said longitudinal members together, means connecting last mentioned means to a point on the draw bar of the tractor, a bracket secured to the front of the tractor and adapted to support the forward portion of the longitudinal members, and means connecting the upstanding arms to the power lift of the tractor.

10. A rake comprising the combination of a tractor having a power lift, a rake frame, a rake head having teeth and upwardly extending arms, means pivotally mounting the rake head to the frame for movement between a raking position and a transport position, said frame including a plurality of longitudinal members and cross members connecting the same, a rock shaft having arms mounted on one of said cross members, link means connecting the arms of the rock shaft to the upstanding arms of the rake head, two of said longitudinal members being extended so as to be adapted to underlie the tractor, means adapted to connect the rear of said last mentioned members to the tractor near the rear thereof, means connecting the forward portions of said last mentioned members to the tractor near the front thereof, and means connecting the rock shaft to the power lift of the tractor.

11. A rake comprising the combination of a tractor having a power lift, a rake frame, a rake head having teeth and upwardly extending arms, means pivotally mounting the rake head to the frame for movement between a raking position and a transport position, said frame including a plurality of longitudinal members and cross members connecting the same, a rock shaft having arms mounted on one of said cross members, link means connecting the arms of the rock shaft to the upstanding arms of the rake head, two of said longitudinal members being extended so as to be adapted to underlie the tractor, means adapted to connect the rear of said last mentioned members to the tractor near the rear thereof, means connecting the forward portions of said last mentioned members to the tractor near the front thereof, and means connecting the rock shaft to the power lift of the tractor, said rock shaft and cross member being arranged on the rake frame so as to extend transversely under the tractor, there being brace means connecting the cross member to the last mentioned longitudinal members.

12. A rake comprising the combination of a tractor having a power lift, a rake frame, a rake head having teeth and upwardly extending arms, means pivotally mounting the rake head to the frame for movement between a raking position and a transport position, said frame including a plurality of longitudinal members and cross members connecting the same, a rock shaft having arms mounted on one of said cross members, link means connecting the arms of the rock shaft to the upstanding arms of the rake head, two of said longitudinal members being extended so as to be adapted to underlie the tractor, means adapted to removably connect the rear of said last mentioned members to the tractor near the rear thereof, means removably connecting the forward portions of said last mentioned members to the tractor near the front thereof, means connecting the rock shaft to the power lift of the tractor, said rock shaft and cross member being arranged in the rake frame so as to extend transversely under the tractor, there being brace means connecting the cross member to the last mentioned longitudinal members and means on the cross member to aid the front wheels of the tractor in passing over the rock shaft and cross member when attaching the rake to the tractor.

13. A rake adapted to be mounted on a tractor comprising a rake frame, a rake head having teeth and mounted thereon, said frame including parts adapted to extend under the tractor, means to removably secure said parts to the tractor, including a pivotal connection near one end of the tractor and a yielding connection near the other end of the tractor, whereby the rake is flexibly carried, and semi-spherical shoes at the ends of the rake head adapted to support the rake at one side when laterally tilted.

14. In combination, a rake adapted to be mounted on a tractor comprising a rake frame engaged with the tractor and a rake engaged with the rake frame, and means for preventing injury to the rake or tractor while passing over uneven ground comprising runners on the rake to ride on the surface of the ground and yieldable members to permit relative movement of the rake with respect to the frame and of the frame with respect to the tractor.

15. In combination a rake and hemispherical runners mounted on the rake to cause it to ride on the surface of the ground whether it is moving in a direction parallel to the teeth or at an angle to that direction.

16. In combination, a rake adapted to be mounted on a tractor comprising a rake frame engaged by the tractor and hemispherical runners mounted on the under surface of the rake whereby the rake rides over rough ground irrespective of the direction of movement of the tractor.

17. In combination, a rake adapted to be mounted on a tractor comprising a rake frame engaging the rake, engaged beneath the tractor and having cross members extending beyond the tractor wheels, and means for permitting the tractor wheels to run over the cross members during the operation of fastening the frame to the tractor without injury to the members, comprising plates attached to the cross members.

18. A rake comprising the combination of a tractor having a power lift, a rake frame, a rake head having teeth and upwardly extending arms, means pivotally connecting the rake head with the frame for movement between a raking position and a transport position, said frame including a pair of longitudinal members adapted to be connected with said tractor, and means comprising links and a rock shaft connecting the upstanding arms with the power lift of the tractor.

19. A rake comprising the combination of a tractor having a power lift, a rake frame, a rake head having teeth and upwardly extending arms, means pivotally mounting the rake head to the frame for movement between a raking position and a transport position, said frame including a pair of parallel longitudinal members spaced close together, means connecting the rear ends of said longitudinal members together, means connecting said last mentioned means to a point on the draw bar of the tractor, a bracket secured to the front of the tractor and adapted to support the front portion of the longitudinal members, and means connecting the upstanding arms to the power lift of the tractor.

20. A rake comprising the combination of a tractor having a power lift, a rake frame, a rake head having teeth and upwardly extending arms, means pivotally mounting the rake head to the frame for movement between a raking position and a transport position, said frame including a plurality of longitudinal members and cross members connecting the same, a rock shaft having arms mounted on one of said cross members, link means connecting the arms of the rock shaft to the upstanding arms of the rake head, two of said longitudinal members being extended to the rear of said tractor, means adapted to connect the rear of said last mentioned members with the tractor near the rear thereof, means connecting the forward portions of said last mentioned members to the tractor near the front thereof, and means operatively connecting the rock shaft with the power lift of the tractor.

21. A rake comprising the combination of a tractor having a power lift, a rake frame, a rake head having teeth and upwardly extending arms, means pivotally mounting the rake head to the frame for movement between a raking position and a transport position, said frame including a plurality of longitudinal members and cross members connecting the same, a rock shaft having arms mounted on one of said cross members, link means connecting the arms of the rock shaft to the upstanding arms of the rake head, two of said longitudinal members being extended rearwardly, means adapted to connect the rear of said last mentioned members with the tractor near the rear thereof, means connecting the forward portions of said last mentioned members with the tractor near the front thereof, and means connecting the rock shaft to the power lift of the tractor, said rock shaft and cross members being arranged on the tractor frame so as to extend transversely thereof, there being brace means connecting the cross members to the last mentioned longitudinal members.

22. In combination, a wheeled supporting means having laterally spaced supporting wheels, a rake including a rake frame and a plurality of teeth operatively carried by said frame, the latter extending laterally beyond said spaced supporting wheels, and a three-point suspension means flexibly supporting the rake frame from said supporting means.

23. In combination, a wheeled supporting means, a rake including a frame and a rake head having a plurality of teeth, the rake head being pivoted to said frame and the frame and head extending laterally beyond the supporting means on both sides thereof, and three-point suspension means flexibly supporting the rake frame from said wheeled supporting means.

24. In combination, a wheeled supporting means having laterally spaced supporting wheels, a rake including a frame and a plurality of rake teeth carried thereby, the frame of the rake extending laterally beyond said supporting wheels, and three-point suspension means flexibly supporting the rake on said wheeled supporting means, said three-point suspension means comprising a single means connecting the rear of the rake frame to the wheeled supporting means and means supporting the forward portion of the rake frame on said supporting means at a plurality of laterally spaced points thereon.

25. A rake adapted to be mounted on a tractor including a frame and a plurality of rake teeth carried thereby, and a three-point suspension system for supporting the rake frame on the tractor and comprising a single means connecting the rear of the rake frame with the draw bar of the tractor and bracket means supporting the forward portion of the rake frame from the front of the tractor.

26. A rake adapted to be mounted on a tractor and comprising a rake frame, a rake head having teeth and pivotally mounted at the forward end of said frame, means pivotally connecting the rear end of said rake frame to the tractor at a single point, and means yieldingly supporting the forward portion of the rake frame on the tractor at a plurality of laterally spaced points.

27. A rake adapted to be connected with a tractor including a frame and a plurality of rake teeth carried thereby, means connecting the rake frame with the tractor, and means to yieldingly press said teeth into engagement with the ground.

28. A rake adapted to be connected with a tractor and comprising a rake frame, a rake head having forwardly projecting teeth and pivotally mounted at the forward end of said frame for vertical movement, means connecting the rake frame with the tractor, and means to yieldingly press said teeth into engagement with the ground.

29. A rake adapted to be mounted on a tractor and comprising a rake frame, a rake head having forwardly projecting teeth and pivotally mounted at the forward end of said frame for vertical movement, means supporting the rake frame on the tractor, and means to raise and lower said rake head including means operative when said rake head is in lowered position to yieldingly press said teeth into engagement with the ground.

30. In combination, wheeled supporting means, a rake carried by said supporting means and including a rake frame extending laterally beyond said supporting means on either side thereof, three-point suspension means supporting the rake frame on the supporting means, and means for preventing injury to the rake while passing over uneven ground comprising runners on the rake adapted to ride on the surface of the ground.

31. In combination, a rake including a frame and a rake head, a dirigible wheeled supporting means for the rake, and a plurality of skids carried by the rake providing for lateral movement of the rake upon lateral movement of said supporting means.

32. In combination, a rake including a frame and a rake head, a dirigible wheeled supporting means for the rake, and a plurality of skids having ground engaging surfaces curved in a plurality of directions and carried by the rake providing for lateral movement of the rake upon lateral movement of said support means.

33. In combination, a rake including a frame and a pivotally mounted rake head, a dirigible wheeled supporting means for the rake, and a plurality of skids having ground engaging surfaces curved in a plurality of directions and carried by the rake providing for lateral movement of the rake upon lateral movement of said supporting means.

34. In combination, wheeled supporting means, a rake including a frame and a pivotally mounted rake head, yielding means pressing said rake head into engagement with the ground, and yielding means providing for lateral tilting of said rake head relative to said supporting means.

35. In combination, a rake adapted to be mounted on a tractor comprising a rake frame supported at a plurality of points on the tractor, a rake pivotally mounted on the rake frame, and means providing for relative movement of said rake with respect to said frame and of said frame with respect to said tractor.

36. In combination, a rake adapted to be supported on a tractor comprising a rake frame supported on the tractor, a rake head mounted at the forward end of said frame, and spring means between said rake head and said frame and between said frame and said tractor for permitting relative movement therebetween.

37. In combination, a rake adapted to be supported on a tractor comprising a rake frame supported on the tractor, spring means for providing for relative movement between said frame and said tractor, a rake head pivotally mounted at the forward end of said frame, said head having vertically extending arms, and spring means between said arms and said frame.

38. In combination, a rake adapted to be supported by a tractor comprising a rake frame yieldingly supported on said tractor, a rake head pivotally mounted on the forward end of said frame, said head having vertically extending arms, means connecting said arms to the power lift of said tractor, and yielding means for permitting movement of said rake head relative said connecting means.

39. In combination, a rake adapted to be supported by a tractor comprising a rake frame yieldingly supported on said tractor, a rake head pivotally mounted on the forward end of said frame, said head having vertically extending arms, means connecting said arms to the power lift of said tractor, yielding means for permitting movement of said rake head relative said connecting means, and substantially hemispherical skids on the under surface of said rake head.

40. A rake adapted to be connected with a tractor and comprising a rake frame, a rake head having forwardly projecting teeth and pivotally mounted at the forward end of said frame for vertical movement, means connecting the rake frame with the tractor, and means to raise and lower said rake teeth including means operative when said rake teeth are in lowered position to yieldingly press said teeth into engagement with the ground.

41. A rake comprising the combination of a tractor having a power lift, a rake frame, a rake head, means pivotally connecting the rake head with the frame for movement between a raking position and a transport position, and arm and link means actuated by said power lift and movable to substantially dead center relationship to move the rake head to one of its positions.

42. A rake comprising the combination of a tractor having a power lift, a rake frame, a rake head having upwardly extending arms, means pivotally connecting the rake head with the frame for movement between a raking position and a transport position, and arm and link means operatively connected with said upwardly extending arms and with the power lift of the tractor, said arm and link means being movable to substantially dead center relationship when the rake head is swung to its transport position.

43. A rake comprising the combination of a tractor having a power lift, a rake frame, a rake head, means pivotally connecting the rake head with the frame for movement between a raking position and a transport position, longitudinally extending link means pivotally connected with said rake head to swing the same, a pivotally mounted rock shaft, an arm carried thereby and connected with said link means, the points of connection of the link means and said arm being disposed so that they lie in a line closely adjacent the pivotal axis of said rock shaft when the rake head is swung to transport position, and means operatively connecting the rock shaft with the power lift of the tractor.

44. A rake comprising the combination of a tractor having a power lift, a rake frame, a rake head, means pivotally connecting the rake head with the frame for movement between a raking position and a transport position, said frame including a pair of longitudinal members adapted to be connected with said tractor, longitudinally extending link means pivotally connected with said rake head to swing the same, a rock shaft mounted for pivotal movement on said frame, arm means carried by the rock shaft and connected with said link means, the points of connection of the link means and said arm means being disposed so that they lie in a line closely adjacent the pivotal axis of said rock shaft when the rake head is swung to transport position, and means operatively connecting the rock shaft with the power lift of the tractor.

HERMAN MOSCHEL.